(12) United States Patent
Defavari et al.

(10) Patent No.: US 11,193,856 B2
(45) Date of Patent: Dec. 7, 2021

(54) METHOD AND SYSTEM FOR OBJECTIVELY TESTING NOISE OF A MOTOR VEHICLE

(71) Applicant: GM GLOBAL TECHNOLOGY OPERATIONS LLC, Detroit, MI (US)

(72) Inventors: Rafael Defavari, Santo Andre (BR); Raphael D. Terezam, Sao Bernando Do Campo (BR); Raphael Oliveria, Santo Andre (BR); Carlos A. Puertas, Sao Caetano Do Sul (BR); Eduardo de Souza Alvarenga, Joinville (BR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 193 days.

(21) Appl. No.: 16/434,707

(22) Filed: Jun. 7, 2019

(65) Prior Publication Data

US 2020/0386655 A1 Dec. 10, 2020

(51) Int. Cl.
*G01M 17/00* (2006.01)
*G01M 17/007* (2006.01)
*G07C 5/00* (2006.01)
*G07C 5/08* (2006.01)

(52) U.S. Cl.
CPC .......... *G01M 17/007* (2013.01); *G07C 5/008* (2013.01); *G07C 5/085* (2013.01)

(58) Field of Classification Search
CPC ..... G01M 17/007; G07C 5/008; G07C 5/085; G07C 3/146
See application file for complete search history.

(56) References Cited

U.S. PATENT DOCUMENTS

| | | | | |
|---|---|---|---|---|
| 5,602,450 A | * | 2/1997 | Cowan | B60R 25/02144 123/179.2 |
| 7,437,274 B2 | * | 10/2008 | Charette | G01M 17/007 702/184 |
| 2009/0279774 A1 | * | 11/2009 | Cook | G06K 9/00 382/141 |

* cited by examiner

*Primary Examiner* — Michael V Kerrigan
(74) *Attorney, Agent, or Firm* — Cantor Colburn LLP (57) ABSTRACT

A method and system of objectively noise testing a plurality of vehicles at a vehicle production facility having a production control system is disclosed. The method includes selecting one of the plurality of vehicles at the vehicle production facility for noise testing, mounting a noise testing device to an interior of the selected vehicle, and testing the selected vehicle by operating the selected vehicle on a noise-inducing test track having a plurality of test track sections and recording the noise data on the noise testing device.

18 Claims, 9 Drawing Sheets

METHOD AND SYSTEM FOR OBJECTIVELY TESTING NOISE OF A MOTOR VEHICLE

INTRODUCTION

The subject disclosure relates to a method and system for objectively conducting noise testing, particularly of a motor vehicle at a vehicle production facility.

OEM manufacturers of motor vehicles test completed or nearly completed vehicles on a production line for various sounds and noises, such as squeaks and rattles, which may be undesirable to a customer or result in warranty claims after vehicle delivery. Current testing techniques require a test operator to run the vehicle through a series of tests and subjectively listen for any perceptible noises that the operator perceives may be undesirable to the customer. While all test operators may be similarly trained, the use of human test operators results in subjective interpretations and judgments as to whether the vehicle should pass the noise test inspection or fail and be re-worked for improvement prior to delivery to the customer.

Accordingly, it is desirable to provide an improved method and apparatus for objectively and automatically determining whether a vehicle has passed or failed a noise test at a vehicle production facility.

SUMMARY

In one exemplary embodiment, a method of objectively noise testing a plurality of vehicles at a vehicle production facility having a production control system is disclosed. The method includes selecting one of the plurality of vehicles at the vehicle production facility for noise testing, mounting a noise testing device to an interior of the selected vehicle, and testing the selected vehicle by operating the selected vehicle on a noise-inducing test track having a plurality of test track sections and recording the noise data on the noise testing device.

In addition to one or more of the features described herein, the method further includes segmenting the recorded noise data for each of the plurality of test track sections and processing the recorded noise data to determine a plurality of sound metrics for each of the test track sections for the selected vehicle to generate a plurality of actual test data curves associated with each of the plurality of sound metrics for each of the plurality of test track sections.

In another exemplary embodiment, the method further includes comparing each of the plurality of actual test data curves for the selected vehicle to a plurality of objectively predetermined threshold limit value curves for each of the plurality of sound metrics for each of the plurality of test track sections to determine whether every point on the plurality of actual test data curves are within threshold limit values of the predetermined threshold limit value curves. The method also includes displaying a passing result on the noise testing device if every point on the actual test data curves are within the threshold limit values of the predetermined threshold limit value curves for every one of the plurality of sound metrics for each of the plurality of test track sections, and displaying a failing result on the noise testing device if even a single point of the actual test data curves is outside of the threshold limit values of the predetermined threshold limit curves for even one of the plurality of sound metrics for even one of the plurality of test track sections whereby the noise testing device automatically provides a test operator with a single objective noise testing result for the selected vehicle without any subjective analysis by a human test operator.

In yet another exemplary embodiment, the noise testing device includes at least two microphones. The method additionally includes further segmenting the recorded noise data into actual test data curves for each microphone and comparing the actual data curves to predetermined threshold limit value curves for each of the microphones for each of the plurality of sound metrics for each of the plurality of test track sections.

In a further exemplary embodiment of the method, the plurality of sound metrics includes at least two or more sound metrics selected from the group consisting of loudness, one third octave analysis, power spectra, loudness, fluctuation, sharpness, and roughness.

In another exemplary embodiment of the method, the plurality of vehicles includes a plurality of vehicle models and the plurality of sound metrics is customized to include only the critical sound metrics for the vehicle model based on a set of predetermined critical threshold limit value curves.

In addition to one or more features described herein for the method, the plurality of test track sections includes at least two or more selected from the group consisting of a bump track section, a rumble strip section, a paver block section, a rope track section, and a twisted ditches section.

In yet another exemplary embodiment, the production control system and the noise testing device are in communication with each other. The method further comprises providing a vehicle identification number to one of the production control system or the noise testing device, synchronizing the production control system and noise testing device to share data associated with the vehicle identification number including a vehicle model for the selected vehicle, providing the noise testing device with one or more predetermined critical threshold limit value curves for the selected vehicle based on its vehicle model, limiting the noise data processing to determining a set of critical actual data curves only for certain sound metrics from certain test track sections associated with the predetermined critical threshold limit value curves, and comparing and generating the passing or failing result only utilizing the critical actual data curves compared with the predetermined critical threshold limit value curves.

In a further exemplary embodiment, the production control system has storage capacity and the noise testing device is in communication with the production control system. The method further comprises sending and storing the recorded noise data to the production control system.

In yet another exemplary embodiment of the method, the step of mounting the noise testing device to the interior of the selected vehicle further includes securely locking a mounting portion of the noise testing device onto a vehicle headrest prior to testing the selected vehicle.

In addition to other exemplary features, the step of mounting the noise testing device to the interior of the selected vehicle further includes securely locking a mounting portion of the noise testing device onto first and second rods of a vehicle headrest prior to testing and removing the noise testing device from the vehicle headrest by unlocking the mounting portion of the noise testing device from the first and second rods of the vehicle headrest when the noise testing is complete whereby the noise testing device is portable between selected vehicles.

In yet a further embodiment of the method, when a failing result is generated, the selected vehicle is put on hold at the vehicle production facility and taken out of a production line for analysis and repair.

In another embodiment, the method further includes determining the predetermined threshold limit value curves by testing a plurality of vehicle samples on the test track with the noise testing device, having a test operator subjectively judge whether the samples are good or bad, segregating the noise data for each of the good samples for each of the test track sections, processing the noise data to determine the plurality of actual data curves for the plurality of sound metrics for each of the good samples for each of the test track sections, averaging the plurality of actual data curves for the objectively good samples for each of the plurality of sound metrics for each of the test track sections to obtain an average data curve for each of the plurality sound metrics for each of the plurality of test tracks, and applying a statistical adjustment factor to each of the actual average data curves of the good samples to establish the predetermined threshold limit value curves for each of the plurality of sound metrics for each of the test track sections.

In yet a further embodiment, the method includes determining the predetermined threshold limit value curves by testing a plurality of vehicles wherein the plurality of vehicles may include a plurality of vehicle models. The noise test results are segregated by vehicle model and the predetermined threshold limit value curves are determined separately for each of the plurality of vehicle models.

In addition to other features described herein, a method of objectively noise testing a plurality of vehicles at a vehicle production facility having a production control system is disclosed. The method includes selecting one of the plurality of vehicles at the vehicle production facility for noise testing, providing a noise testing device that is in communication with the production control system, inputting a motor vehicle identification number of the selected vehicle into the noise testing device and storing the information in the production control system, mounting the noise testing device to an interior of the vehicle, and testing the selected vehicle by operating the vehicle on a test track having a plurality of test track sections and recording the noise data on the noise testing device. The method further includes determining a plurality of actual test curves for each of a plurality of sound metrics for each of the plurality of test track sections for the selected vehicle, comparing each of the plurality of actual test curves for the selected vehicle to a plurality of predetermined threshold limit value curves for each of the plurality of sound metrics for each of the plurality of test track sections for a similar vehicle model having good noise performance to determine if any point on the plurality of actual test curves for the selected vehicle is outside of the predetermined threshold limit value curves, and generating and displaying a pass message on the noise testing device when all of the plurality of points on the plurality of actual test curves is determined to be within the associated predetermined threshold limit value curves whereby the selected vehicle can proceed in the vehicle production facility, and generating and displaying a fail message on the noise testing device when any of the plurality of points on the plurality of actual test curves is determined to be outside of its associated predetermined threshold limit value curves whereby the selected vehicle is directed to be held from proceeding in the production facility and is analyzed and repaired. Accordingly, the selected vehicle is objectively and automatically analyzed for passing or failing the noise test without any subjective input from a test operator.

In another exemplary embodiment of the method, the plurality of sound metrics includes two or more of ⅓ octave, power spectra, loudness, fluctuation, sharpness, roughness, and loudness.

In yet another exemplary embodiment of the method, the step of mounting the noise testing device to the interior of the vehicle further includes mounting the noise testing device to a headrest structure of a vehicle seat utilizing a locking portion on the mounting device and wherein the step of removing the noise testing device from the headrest structure includes unlocking the locking portion of the mounting device from the headrest structure.

In a further embodiment, a noise testing system for testing a selected vehicle in a vehicle production facility having a production control system is disclosed. The system includes a noise testing device having a mounting device for removably connecting the noise testing device to a headrest structure of a seat of the selected vehicle, the mounting device including at least one microphone for recording noise data and a sound module, the mounting device including an anchorage device configured to removably lock and unlock from the vehicle headrest, and the noise testing device being configured to communicate with the vehicle production control system.

In another exemplary embodiment of the system, the noise testing device includes first and second rods on the headrest structure and first and second ends on the anchorage device. The first end of the anchorage device has a concave recess for receiving the first rod therein and the second end has a rotatable hinged portion for releasably receiving the second rod therein. The second end has a locking portion, and the locking portion has a locking knob configured to lock the hinged portion around the second rod. Accordingly, when the hinged portion is rotated to a closed position and the locking knob is locked, the first and second ends are securely locked onto the first and second rods such that the noise testing device is securely mounted on the headrest during noise testing and thereafter removable for porting to another vehicle on the production line.

In a further exemplary embodiment of the system, the noise testing device and the production control system are in communication with each other such that a vehicle identification number is synchronized between the noise testing device and the production control system for each selected vehicle. Accordingly, the noise data recorded from the vehicle can be stored in the production control system in association with the vehicle identification number.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. Those having ordinary skill in the art will recognize that terms such as "above," "below," "upward," "downward," "top," "bottom," etc., are used descriptively for the figures, and do not represent limitations on the scope of the invention, as defined by the appended claims.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments may be described herein in terms of functional and/or logical block components and various processing steps. It should be appreciated that such block components may be realized by any number of hardware, software, and/or firmware components configured to perform the specified functions. For example, an embodiment may employ various integrated circuit components, (e.g., memory elements, digital signal processing elements, logic elements, look-up tables, or the like,) which may carry out a variety of functions under the control of one or more microprocessors or other control devices. In addition, those skilled in the art will appreciate that embodiments may be practiced in conjunction with any number of control systems, and that control systems described herein are merely exemplary.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Although the figures shown herein depict an example with certain arrangements of elements, additional intervening elements, devices, features, or components may be present in actual embodiments. It should also be understood that the figures are merely illustrative and may not be drawn to scale.

Figure 1:
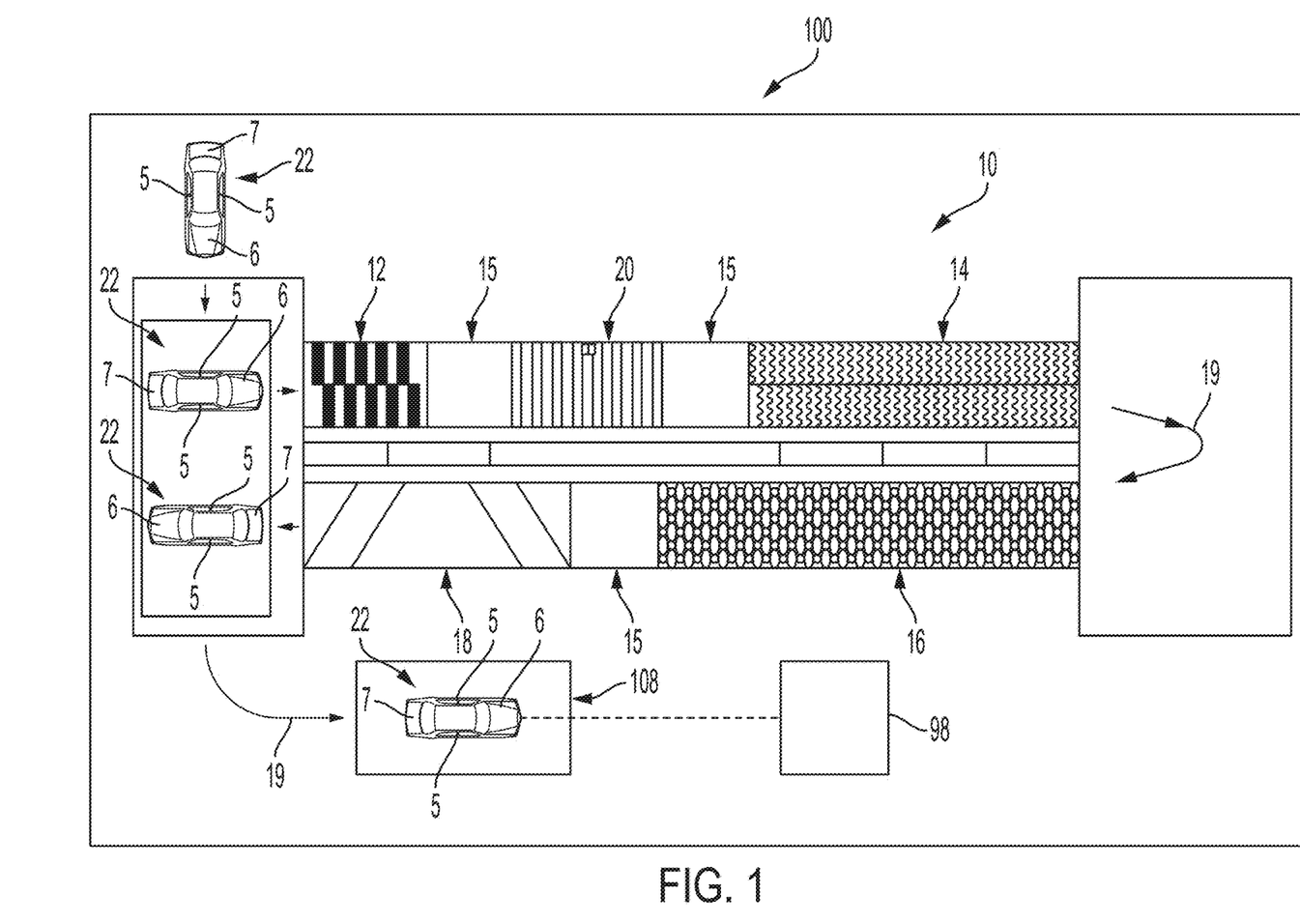
FIG. 1 is a schematic view of vehicle production facility with a noise test track.

In accordance with an exemplary embodiment, FIG. 1 illustrates an exemplary noise test track 10 located at a vehicle production facility 100 for noise testing a plurality of motor vehicles 22 to determine whether the selected vehicles 22 pass or fail a noise test inspection at the production facility 100 and continue towards the completion process for shipment to dealers and delivery to a customer. Such an exemplary test track 10, may include several driving tests in which a test operator drives the selected vehicle 22 through the test track 10. For example, the test track 10 may include a bump track section 12 having large spaced-apart bumps, a rumble strip section 14 having closely-spaced, carved out strips therein, a paver block section 16 comprised entirely of rough bricks, a twist ditches section 18 with two large, wide uneven sequential ditches, and a rope track section 20 having closely spaced bumps. All of these sections of the test track 10 are designed to induce noise. The test track 10 can also include some smooth road transition sections 15 and turning sections 19. In addition, the vehicles 22 can also be run through other static operational noise tests such as opening and closing the vehicle doors 5, hood 6, and trunk 7. By way of example, such static noise tests may be conducted in a static noise testing area 108 after running through the test track 10. While FIG. 1 shows an exemplary noise-inducing test track 10 with exemplary noise-inducing sections (12, 14, 16, 18, 20) and static noise testing area 108, it will be appreciated that the sections may be placed in different orders or that some sections may be subtracted or added based on regional preference of the facility as determined by local road conditions where the vehicles 22 may be sold to customers.

Figure 2:
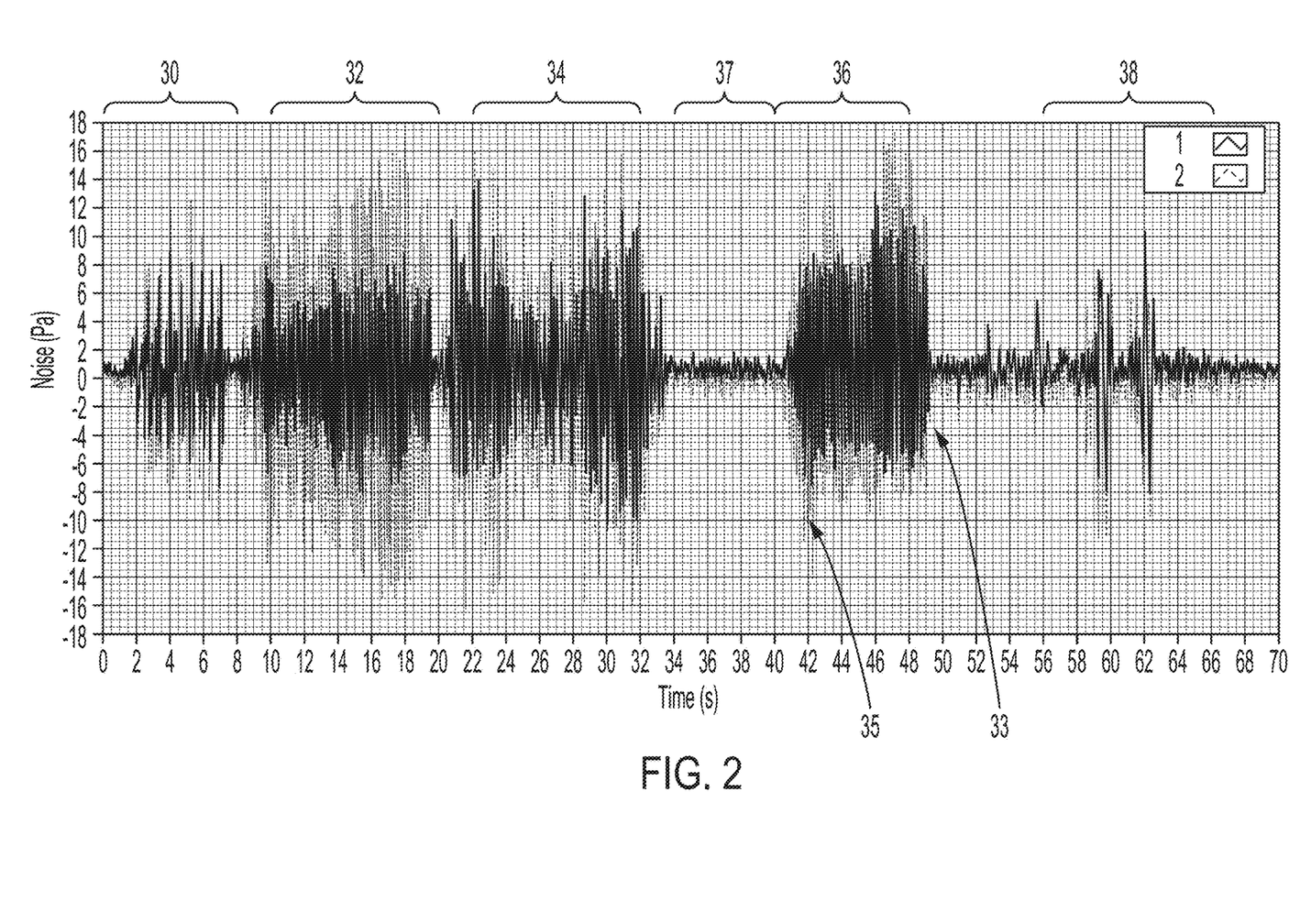
FIG. 2 is an exemplary graph plotting noise in pascals versus time for an exemplary waveform curve collected from a vehicle operated on a noise test track.

FIG. 2 shows an exemplary time waveform of a noise data recording corresponding to particular sections on another exemplary test track (not shown). The graph plots noise results in pascals versus time in seconds for a selected vehicle 22 run on the exemplary test track. The exemplary graph has a first section generally indicated at 30 from about 0-8 seconds representing the bump track section 12, a second section generally indicated at 32 from about 10-20 seconds representing the rumble strip section 14, a third section generally indicated at 34 from about 20-34 seconds representing the paver block section 16, a fourth section generally indicated at 36 from about 42-49 seconds representing the rope track section 20, and a fifth section generally indicated at 38 from about 58-63 seconds representing the twisted ditches section 18. The graph data also represents the smooth transition section 15 from about 34-42 seconds generally indicated at 37. The graph shows a first line 33 representing noise data from a first front microphone 90 and a second line 35 representing noise data from a second rear microphone 91 of a noise testing device 50, as described further herein. It will be appreciated that for this exemplary noise testing device 50 that two microphones 90, 91 were utilized to capture the sound inside the vehicle 22; however, one or more microphones could be utilized in communication with the noise testing device 50. It will be appreciated that each track section has a different noise pattern and each test track section can be segregated and analyzed to determine the particular threshold limit value curves for that particular track section, as described further herein.

Figure 3:
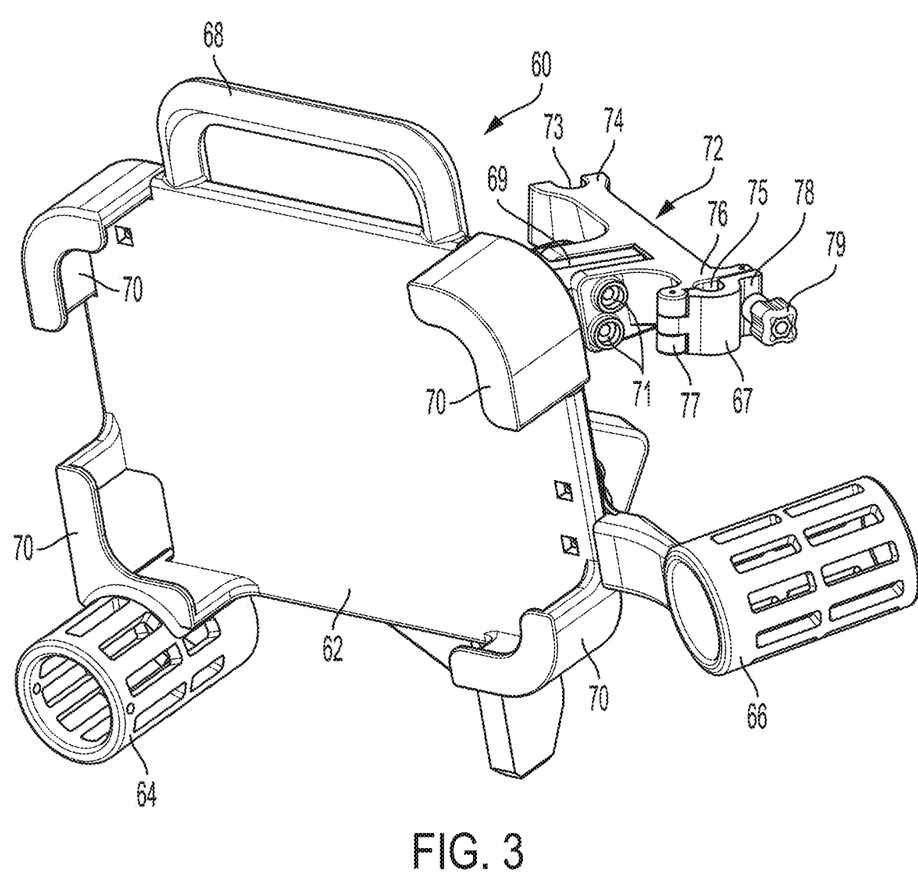
FIG. 3 is a perspective view of an exemplary mounting device for a noise testing device.
Figure 6:
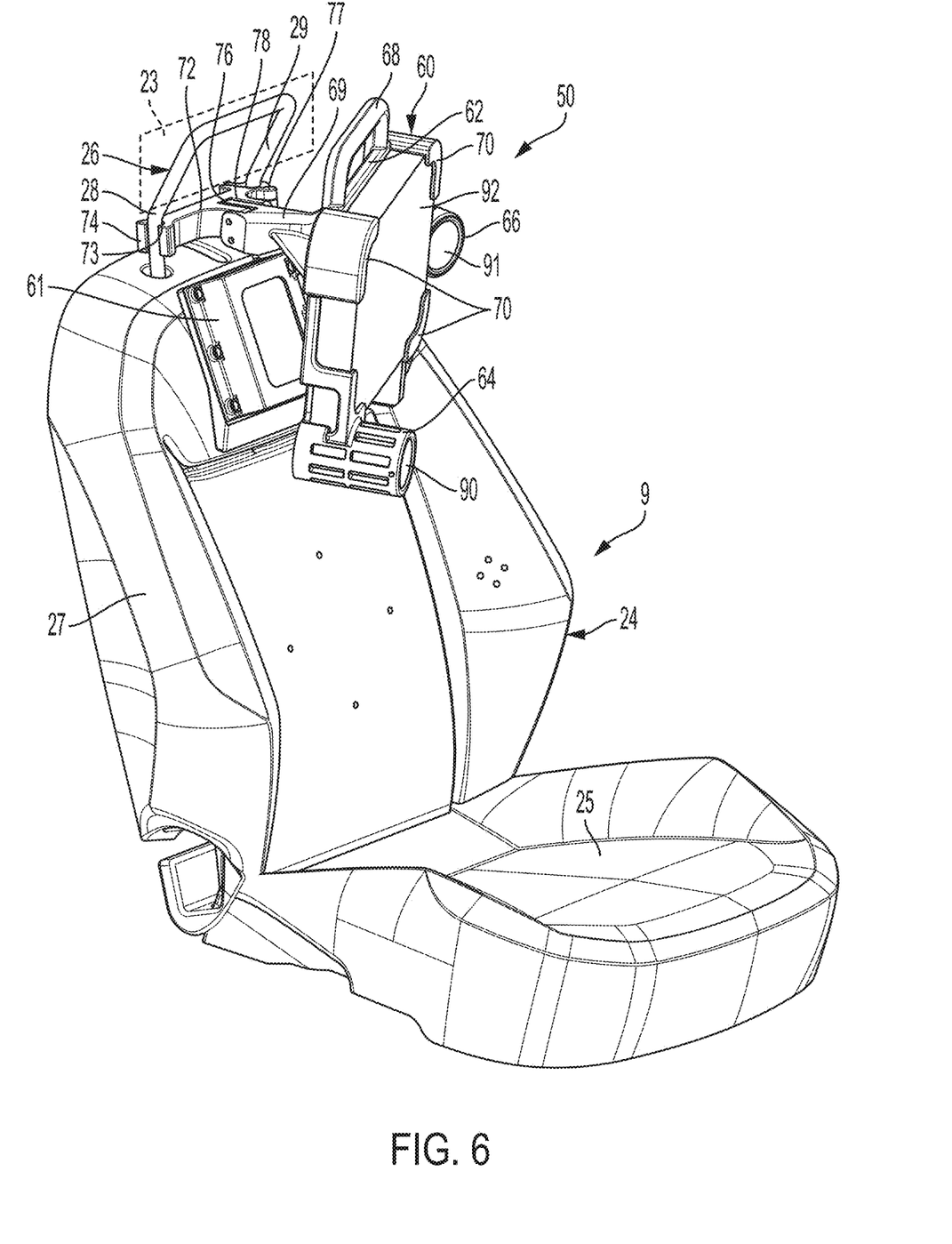
FIG. 6 is a perspective view of an exemplary vehicle seat shown with a noise testing device mounted thereon.
Figure 7:
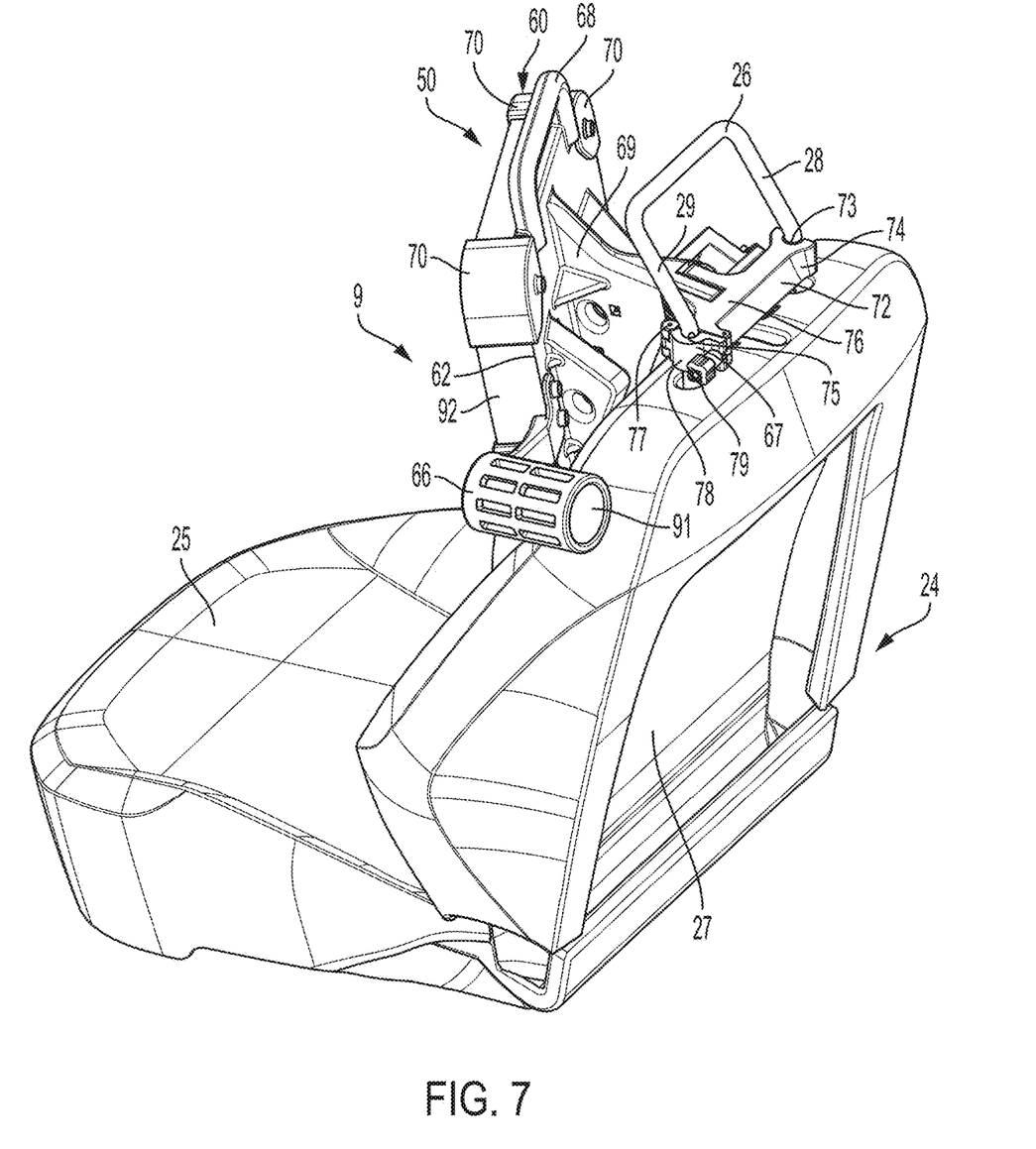
FIG. 7 is another perspective view of an exemplary vehicle seat shown with a noise testing device mounted thereon.

With reference to FIG. 3, an exemplary mounting device 60 for the noise testing device 50 is shown. The mounting device 60 includes an operator interface screen area 62, a front microphone holder 64, a rear microphone holder 66, and a carrying handle 68. Referring also to FIGS. 6 and 7, the operator interface screen area 62 includes pocket portions 70 for securely holding a tablet 92. It will be appreciated that while the tablet 92 is shown that other display screens or operator interfaces with a display screen, such as a laptop, may also be used. The front and rear microphone holders 64, 66 each have a cage-like structure to permit sound to travel through and be readily recorded by the front and rear microphones 90, 91 respectively.

Figure 4:
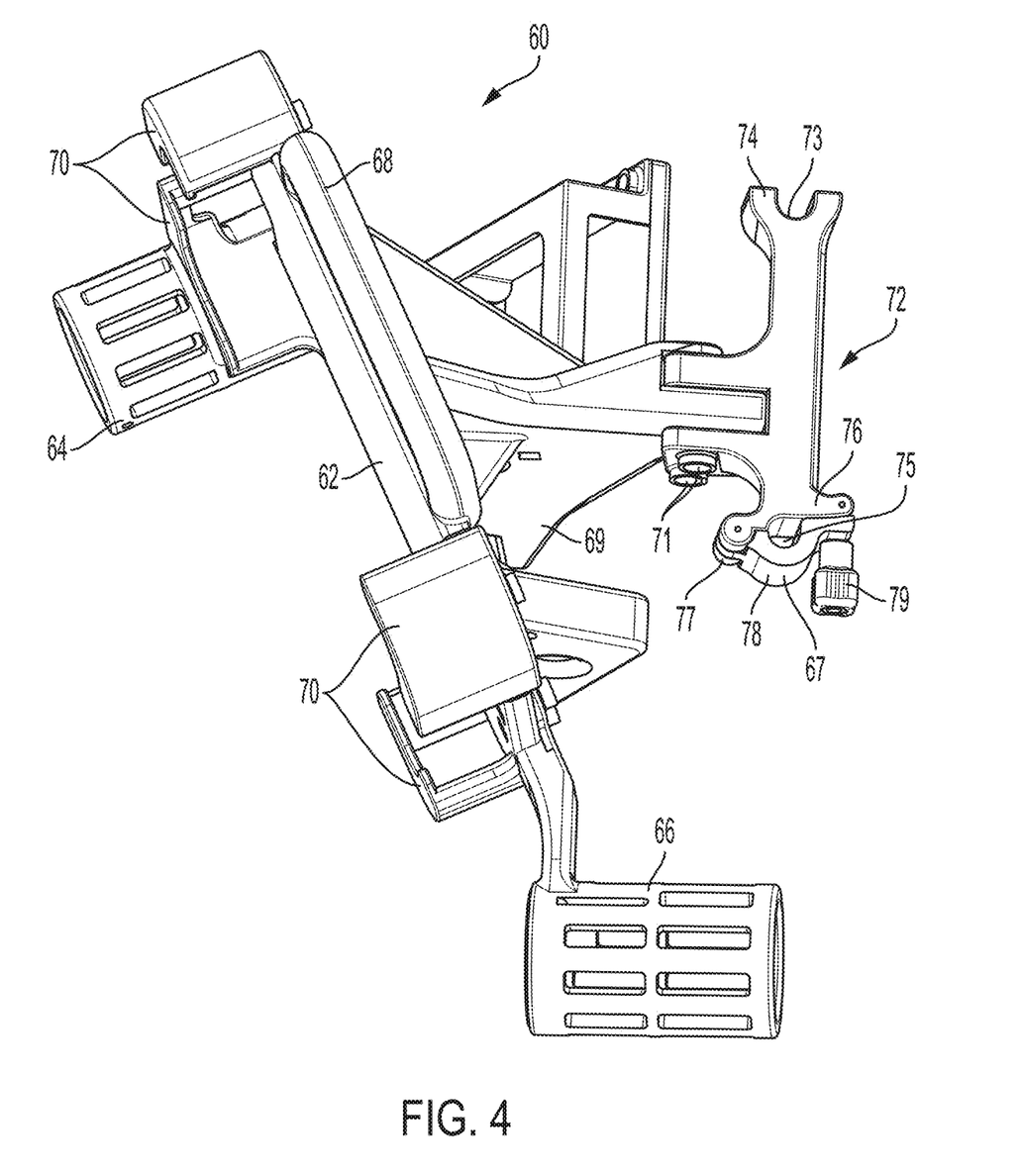
FIG. 4 is another perspective view of an exemplary mounting device for a noise testing device.

With reference to FIGS. 3-7, the mounting device 60 further includes an anchorage device 72 for removable attachment to a headrest structure 26 of a vehicle seat 24. As best shown in FIGS. 3 and 4, the anchorage device 72 may be formed of a separate piece that is removable from an arm portion 69 of the mounting device 60 by loosening or removing fasteners 71. Advantageously, the anchorage device 72 can be custom made to fit the size and shape of the headrest structure 26 for any particular vehicle model. With reference to an exemplary embodiment in FIGS. 3, 6, and 7, the anchorage device 72 has a concave first mounting end 74 shaped for receiving a first rod 28 of the headrest structure 26 and a second mounting end 76 shaped for fixed attachment to a second rod 29 of the headrest structure 26. The second mounting end 76 includes a locking portion 78 having a hinged portion 67 that is rotatably attached by a hinge 77 to the second mounting end 76. The locking portion 78 includes a threaded locking knob 79 thereon that may be tightened or loosened to open or close the hinged portion 67 onto the headrest structure 26, as described further herein. It will be appreciated that the anchorage device 72, locking portion 78, hinged portion 67, and locking knob 79 are exemplary and may be configured in a suitable manner to securely lock onto the shape of the headrest structure 26 of the vehicle seat 24.

As best shown in FIGS. 6 and 7, the vehicle seat 24 is located in a vehicle interior 9 and includes a seat cushion portion 25 and a seat back portion 27. The headrest structure 26 is attached at atop of the seat back portion 27. The headrest structure 26 is shown as having the first rod 28 and the second rod 29. As shown schematically in FIG. 6, the vehicle seat 24 includes a headrest cushion 23 which is not shown in FIG. 7 for clarity. However, it will be appreciated that the headrest structure 26 may be different shapes and sizes. Advantageously, the anchorage device 72 is shaped to removably attach to the headrest structure 26, as described herein. To attach the noise testing device 50 to the headrest structure 26 of the selected vehicle 22, the first concave mounting end 74 of the anchorage device 72 is pushed over the inner side of the first rod 28. Then the second mounting end 76, with the hinged portion 67 of the locking portion 78 rotated about hinge 77 to an open position, may then be slipped over the inner side of the second rod 29. Once in this position, then the hinged portion 67 of the locking portion 78 can be rotated about hinge 77 to a closed position and the locking knob 79 can be fastened or screwed in place to lock the locking portion 78 onto the second rod 29. As shown in FIGS. 6 and 7, the noise testing device 50 is then securely attached to the headrest structure 26.

Figure 5:
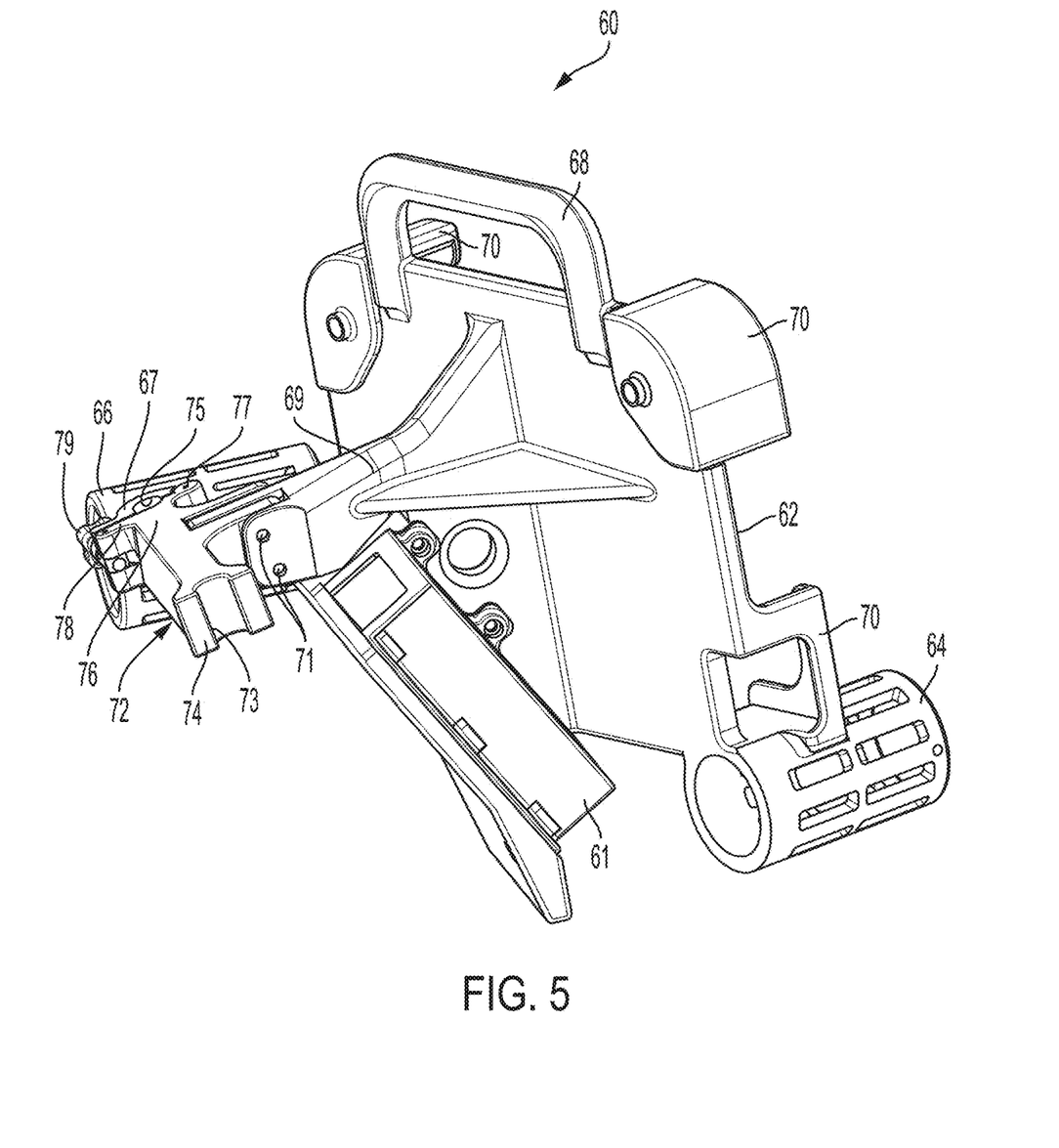
FIG. 5 is yet another perspective view of an exemplary mounting device for a noise testing device.

As best shown in FIG. 5, the noise testing device 50 with the mounting device 60 further includes a sound module 61 attached thereto for collecting the noise data from the front and rear microphones 90, 91. With reference to FIGS. 6 and 7, the noise testing device 50 further includes the front microphone 90 mounted in the front microphone holder 64 of the mounting device 60 and the rear microphone 91 mounted in the rear microphone holder 66. The tablet 92 is secured to the operator interface screen area 62 of the mounting device 60 by sliding into pocket portions 70. The microphones 90, 91 are in communication with the sound module 61 to collect and process the noise data from the selected vehicle 22 during noise testing. The sound module 61 is in communication with the tablet 92 whereby the tablet 92 further processes and analyzes the noise data to display a single objective PASS or FAIL result, as described further herein. It will be appreciated that the mounting device 60 may be customized in accordance with the vehicle design and/or the desired sound test recordings and results.

The tablet 92 is in communication with the production control system 98 at the vehicle production facility 100. It will be appreciated that the tablet 92, microphones 90, 91 and sound module 61 may be suitable commercial hardware with general specifications suitable for noise data acquisition. The exemplary microphones 90, 91 may have a dynamic range of 100 dB and higher, ICP power capable and sound module dynamic signal analyzer dual or multi-channel and at least 24 bits (DAC.)

It will also be appreciated that communication between the microphones 90, 91, sound module 61 and tablet 92 may be wired connections or wireless connections, such as bluetooth. It will further be appreciated that the communication between the tablet 92 and the production control system 98 is preferably a wireless connection.

The exemplary mounting device 60 is molded of a plastic material with a separately molded anchorage device 72, locking portion 78 and locking knob 79. It will be appreciated that the mounting device 60 construction is exemplary and could be made of other suitable plastics (reducing the weight and risk of vehicle damage) or metals and may be made of multiple pieces connected together or a single integrally molded, formed or machined piece. The mounting device 60 together with the microphones 90, 91, the tablet 92, and the sound module 61 and other connecting wires or accessories (not shown) provide the noise testing device 50. Advantageously, the noise testing device 50 is removably attachable to the seat 24 being a self-contained and portable unit that easily can be moved between selected vehicles 22 for noise testing.

With reference to FIG. 1, it will be appreciated that the production control system 98 may be any suitable data storage environment comprised of suitable hardware and software for collecting and storing data at a vehicle production facility 100 for tracking vehicles by a vehicle identification number. By way of example, the test operator scans or manually enters the vehicle identification number into the noise testing device 50, and the noise testing device 50 sends the vehicle identification number to the production control system 98. Advantageously as described further herein, then the production control system 98 synchronizes and exchanges data with the noise testing device 50, and the production control system 98 sends to the noise testing device 50 detailed information regarding the vehicle model, body style and other features that determine the customized threshold limit value curves for the particular selected vehicle 22 that is being noise tested. While an exemplary embodiment is described with the tablet 92 primarily processing the noise data, it will further be appreciated that the data processing can also be conducted on the production control system 98 with information sent back to the tablet 92 or the data can be processed by a combination of the tablet 92, sound module 61, and production control system 98 in communication with each other. It will be appreciated in an exemplary embodiment that when the noise data is processed locally on the tablet 92, the historical data results will be sent to an external server as a traceability for future consultation and artificial intelligence proposals.

The production control system 98 will have capability available in the system which includes a HOLD or STOP production status that can be triggered for a selected vehicle 22 based on the status of the selected vehicle 22 at the production facility 100. When the HOLD is triggered based on the selected vehicle 22 failing the noise test when that actual data falls outside the predetermined threshold limit value curves for the particular vehicle model, as described herein, then the selected vehicle 22 will be removed from the production line and taken to a repair area for off-line work, as needed, to analyze and repair the objectively detected noise defect.

To develop the objective noise testing criterion for deciding a PASS or FAIL result for the noise test, a set of objective threshold limit value curves are predetermined as acceptable criterion to compare against the actual test data curves of the selected vehicle 22 and determine whether the selected vehicle 22 is objectively good to PASS or objectively bad to FAIL the noise test. To establish the objective criterion, a large number of sample vehicles were tested on the exemplary noise-inducing test track 10, including noise-inducing test track sections. The test operators rated the sample vehicles as being subjectively good samples or subjectively bad samples. A subjectively good sample means there was no humanly perceptible noise defect perceived by the test operator, and a subjectively bad sample means there was a humanly perceptible noise defect perceived by the test operator. A perceptible noise defect is a squeak, rattle, whistle or any other noise that is subjectively offensive to the human test operator. At the same time, the raw noise data from the sample vehicles was collected using the noise testing device 50, including the microphones 90, 91 and sound module 61. The noise data and resulting processed sounds metric results for the subjectively good samples were segregated from the subjectively bad samples.

Figure 8A:
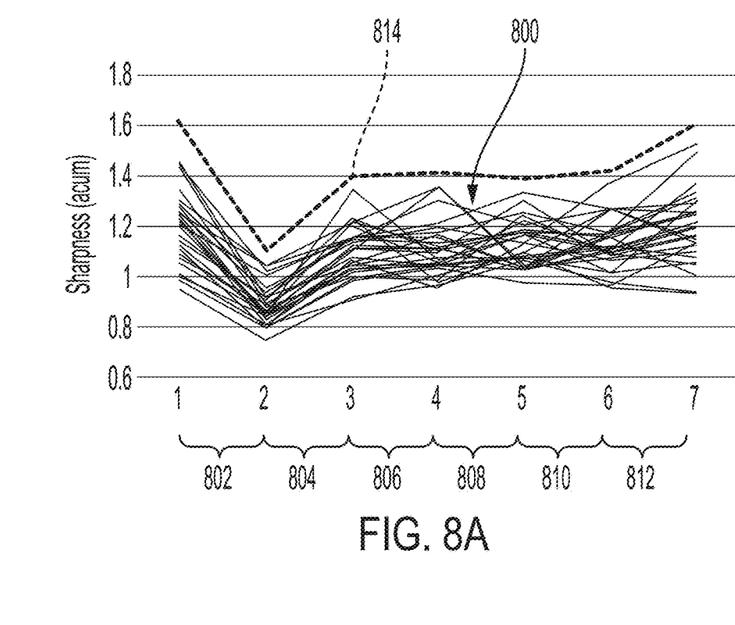
FIG. 8A is an exemplary graph showing noise sharpness level data curves calculated from noise data collected on a noise test track for vehicles that are passing or subjectively good samples.
Figure 8B:
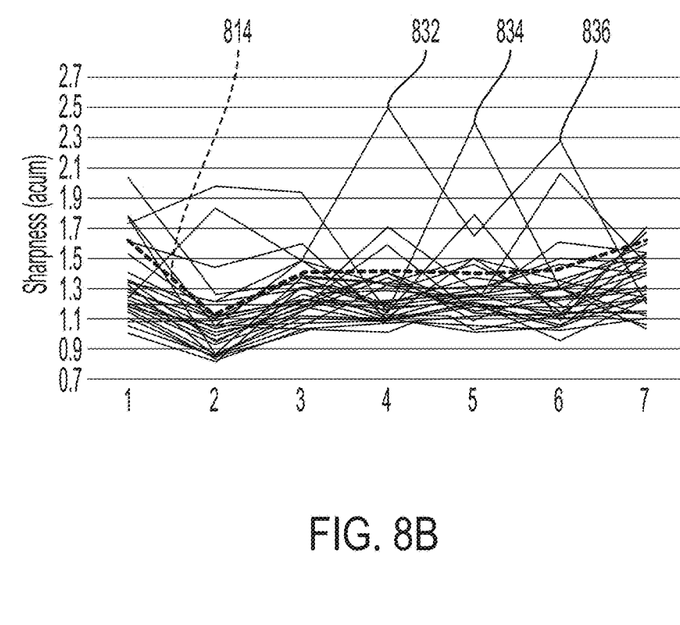
FIG. 8B is an exemplary graph showing noise sharpness level data curves calculated from noise data collected on a noise test track for vehicles that are failing or subjectively bad samples.

With reference to FIGS. 8A and 8B, one example is shown of how collected data was processed and segregated into data for subjectively good samples shown in FIG. 8A and for subjectively bad samples shown in FIG. 8B and used to create one example of the numerous predetermined threshold limit value curves. FIG. 8A shows a set of the mean values of multiple lines of actual data curves at 800 calculated for the sound metric of sharpness, as one sound metric example, from a plurality of sample vehicles that were determined by test operators as passing or subjectively good samples. The vehicle samples all have the same vehicle model characteristics, which may be based on vehicle model only or even more details such as a vehicle model with certain vehicle interior features or powertrain types. As described herein, this set of good actual data curves 800 are analyzed to create an objective threshold limit value curve for each microphone, for each of the plurality of sound metrics for each portion of the test track 10 for each vehicle model, as described herein.

With reference to FIG. 8A as an example, a graph is shown that plots sharpness, as one sound metric example, in acums versus time with various sections of time representing noise data measure or analyzed from specific sections of the test track 10 from the rear microphone 91 of the noise testing device 50. In this particular example, the section from 1-2 shown at 802 of the graph represents the bump track section 12, the section on the graph from 2-3 shown at 804 represents the rumble strip section 14, the section on the graph from 3-4 shown at 806 represents the paver block section 16, the section on the graph from 4-5 shown at 808 represents the rope track section 20, the section on the graph from 5-6 shown at 810 represents the twist ditches section 18, and the section on the graph from 6-7 represents a speed bump section (not shown). An average or mean value of the noise data from the good samples is calculated and represented in these multiple actual data curves at 800. In addition, the average and standard deviation is calculated for all of these data curves for the good samples for the vehicle model for the sound metric of sharpness for each section of the test track 10. The maximum allowable threshold limit value curve to pass the noise test for the sound metric, for example of sharpness, measured on the rear microphone 91 for the selected vehicle 22 is based on statistical values calculated on previously tested vehicles considered to be subjectively good vehicles.

This acceptable maximum threshold limit value curve is indicated at line 814 on the graph. While a limited number of lines of data are shown in FIG. 8A, it will be appreciated that the population of sample vehicles may preferably be as large as possible.

To determine the best possible sound metric, the noise data from each test track section is segmented and analyzed for a plurality of sound metrics which may be offensive to the human test operator. An exemplary set of sound metrics used includes: ⅓ octave analysis (splits the noise data into octave bands to provide a further in-depth outlook on noise levels across the frequency composition), power spectra analysis (determines which frequencies contain the signal's power), loudness (intensity of the sound), fluctuation analysis, sharpness analysis, and roughness (perception of rapid (15-300 Hz) amplitude modulation of a sound).

FIG. 8B shows the same data as FIG. 8A, but for the subjectively bad vehicles. The noise data from these sample vehicles that were considered to be subjectively bad were not used to determine the predetermined threshold limit value curve 814. It will be appreciated that some of the sample vehicles have data values that exceed the threshold limit value curve at line 814, for example at points 832, 834, and 836, as a few examples of data points that exceed the predetermined threshold limit value curve 814. However, it will also be appreciated that not all subjectively bad samples have data values that exceed this one particular threshold limit value curve 814 and fail this particular sound metric specific to sharpness measured from the rear microphone 91. Some of the sample vehicles that were determined to be subjectively bad or failing vehicles from the control set may have failed due to a different sound metric.

It will be appreciated that FIGS. 8A and 8B are just one example. The average value for the noise data curves from the subjectively good samples was calculated for each microphone position, for each test track section, and for each sound metric. These were averaged separately for each vehicle model and even for each vehicle model with certain features that might be considered important for noise testing analysis, including by way of example only, hatchback versus sedan, or different trim levels with different seating arrangements or different powertrain types. By way of example, one sample vehicle model has two microphones and runs through seven test track sections with each set of data from each microphone for each test track section being processed and analyzed for six different sound metrics—⅓ octave, power spectra, loudness, fluctuation, sharpness, and roughness—resulting in 72 data sets. For only the entirely subjectively good samples with no perceptive noise defects at all as perceived by the human test operators, the average actual data value curves each of the 72 data sets (including 2 microphones, six sound metrics, and six test track sections) were calculated. Once those average curve values were obtained for a large set of each sample vehicle model for the subjectively good samples, then a statistical analysis, using averaging and a statistical adjustment factor (such as standard deviation), was conducted on the actual noise data for each sound metric for each microphone 90, 91 and each test track section for the good samples resulting in 72 objective predetermined threshold limit value curves that provide a certain and objective criterion for the acceptable predetermined threshold limit value curves. In accordance with the process, if any one of the points of noise data for the actual noise data curve calculated for the selected vehicle 22 being falls outside of even one of the 72 predetermined threshold limit value curves when processed and compared to the acceptable and objective predetermined threshold limit value curves, then the selected vehicle 22 on the production line receives a FAIL message displayed on the noise testing device 50. The more vehicle samples evaluated for any given vehicle model, then the more accurate the predetermined threshold limit value curves will be for comparison to ensure that good vehicles are accepted and PASS and are not over-rejected. In practice, it will be appreciated that it is possible in the production facility 100 to use the predetermined threshold limit value curves for the objective PASS or FAIL decision, but also continue to separately collect subjective data as to whether it was perceived to be a subjectively good sample or a subjectively bad sample along with repair data to continually collect data or use artificial intelligence or statistical calculations to continue to recalculate and improve the objective predetermined threshold limit value curves based on additional data collected over time.

It will further be appreciated that while the example threshold limit value curves are described in terms of an upper threshold limit, it is possible that the threshold limit value curve for a particular sound metric, might have an upper and lower threshold limit value curve, for example for frequency, such that a particular sound metric might need to fall within the upper and lower objective and acceptable predetermined threshold limit value curves for a particular sound metric.

It will also be appreciated that the objective and acceptable predetermined threshold limit value curves were determined using only the collected and processed noise data from the subjectively good samples. To further refine the noise testing process, a predetermined list of critical parameters to determine a set of critical predetermined threshold value curves may be created by noise testing numerous sample vehicle models and statistically analyzing to determine upper thresholds for each of the sound metrics for each of the test track sections and determining which are the critical parameters which determine whether the vehicle model passes or fails the noise test.

For example, in Table 1 below, the higher efficiency numbers indicate which sound metrics are the most useful in statistically analyzing whether the vehicle model should pass or fail the noise test. For Models A and B, the power spectra, fluctuation, sharpness and fluctuation sound metrics provided the most efficient noise testing results. For Model C, the one-third octave metric provided the most efficient result. Accordingly, the production control system 98 provides the vehicle model information to the tablet 92 of the noise testing device 50. In such case, the noise testing may be customized to continuously improve the data segregation rule based on the efficiency of the threshold limit value curves. In such case, the noise testing device 50 may become more customized and able to reduce the amount of noise data collected, processed and compared using only the most critical parameters as determined for the vehicle model. This could save time and space for data collection, processing computational time, storage and battery power for the automated and objective noise testing device 50. In such case, select sound metrics can be chosen for each vehicle model and each test section and microphone based on continuously improved statistical analysis over time either manually or with the help of artificial intelligence learning for the system. It will be appreciated that Table 1 shows one set of exemplary data prior to further fine tuning the procedure to improve efficiency with noise data files and analysis.

TABLE 1

| SOUND METRICS | All Models | | | Model A | | | MODEL B | | | MODEL C | | |
|---|---|---|---|---|---|---|---|---|---|---|---|---|
| | Refused | Approved | Effic. (%) | Refused | Approved | Effic. (%) | Refused | Approved | Effic. (%) | Refused | Approved | Effic. (%) |
| 1-3 OCTAVE | 12 | 77 | 86.5 | 2 | 21 | 91.3 | 3 | 22 | 88.0 | 4 | 37 | 90.2 |
| POWER SPECTRA | 14 | 75 | 84.3 | 1 | 22 | 95.7 | 1 | 24 | 96.0 | 5 | 36 | 87.8 |
| LOUDNESS | 12 | 77 | 86.5 | 2 | 21 | 91.3 | 3 | 22 | 88.0 | 5 | 36 | 87.8 |
| FLUCTUATION | 17 | 72 | 80.9 | 1 | 22 | 95.7 | 1 | 24 | 96.0 | 7 | 34 | 82.9 |
| SHARPNESS | 14 | 75 | 84.3 | 1 | 22 | 95.7 | 1 | 24 | 96.0 | 6 | 35 | 85.4 |
| ROUGHNESS | 15 | 74 | 83.1 | 0 | 23 | 100 | 1 | 24 | 96.0 | 5 | 36 | 87.8 |

Figure 9:
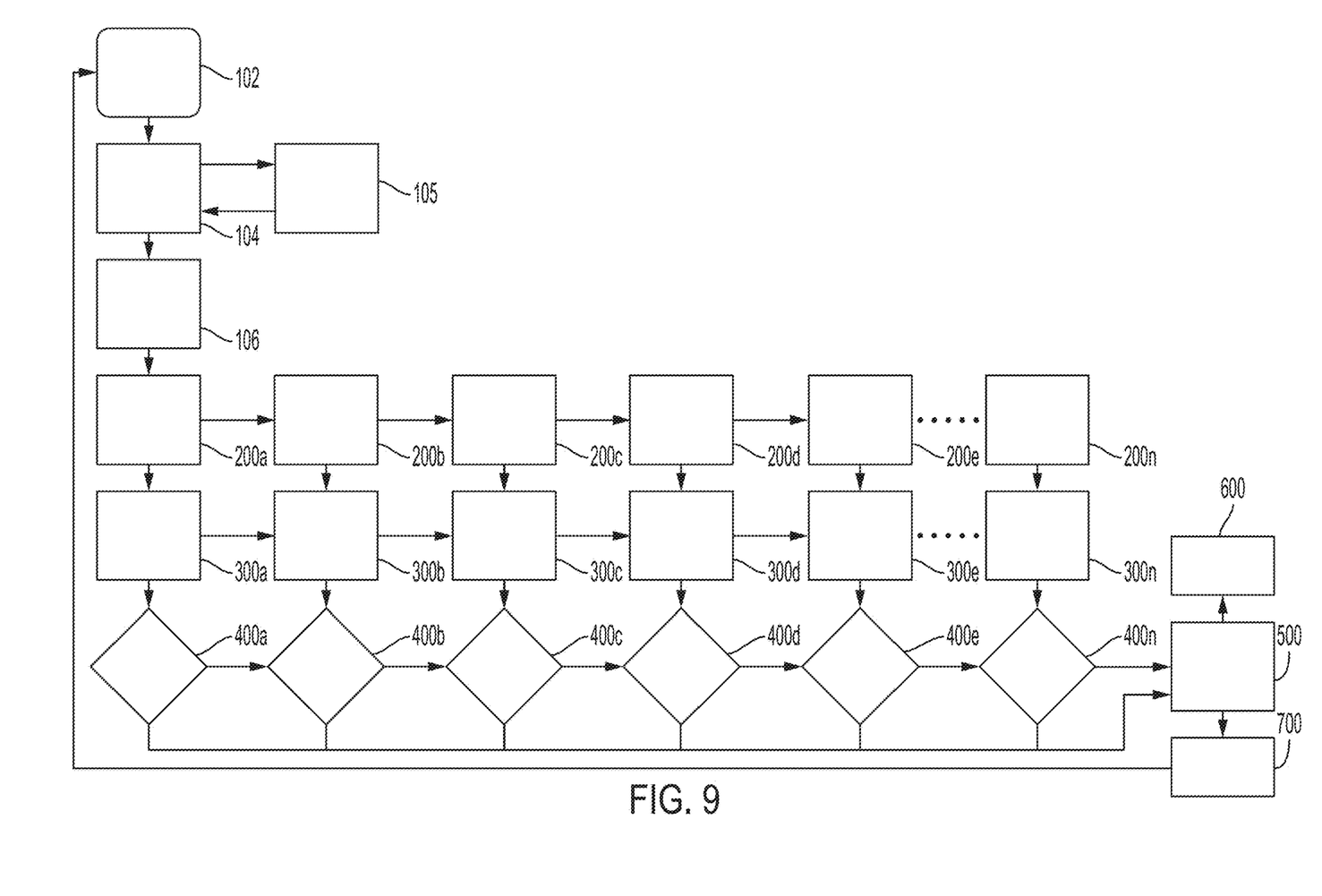
FIG. 9 is an exemplary flow chart showing a method of noise testing vehicles at a vehicle production facility.

Referring now to FIG. 9, a flow chart is shown representing the process at the production facility 100 for noise testing a plurality of selected vehicles 22. At box 102, the vehicle 22 is selected. At box 104, the vehicle identification number for the selected vehicle 22 is entered into the tablet 92 of the noise testing device 50 and synchronized at 105 with the production control system 98, including vehicle identification number and associated vehicle model and feature data so the selected vehicle 22 is accurately identified for noise testing and within the production process. The noise testing device 50 is attached to the headrest structure 26 of the seat 24 of the selected vehicle 22. The production control system 98 provides the information for the noise testing device 50 to identify the predetermined limit threshold limit value curves for the associated vehicle model. It will be appreciated that for certain vehicle models, the predetermined threshold limit value curves may be a selected subset of such curves as has been determined to be determinative or critical to passing the noise test for that particular vehicle model, as described herein, to be the most efficient sound metrics for determining the pass or fail criterion of the noise test, so that the amount of noise data to be collected and processed by the noise testing device 50 may be limited to the noise data to create the actual data curves for the sound metrics and test track sections needed for only the critical predetermined threshold limit value curves.

To conduct the noise test at 106, the test operator runs selected vehicle 22 through the test track 10 with noise data collected using microphones 90, 91 and sound module 61 to collect and provide some initial processing of the noise data which is communicated to the tablet 92 for additional data processing and analysis. In tablet 92, the noise data collected from each of the respective test sections is analyzed to determine if the selected vehicle 22 passed or failed by comparing the actual noise data curves against the acceptable predetermined threshold limit value curves that are customized for that particular vehicle model. By way of example, box 200*a* represents the collection of the noise data for the bump track section 12, box 200*b* represents the noise data collection for the rumble strip section 14, box 200*c* represents the noise data collection for the paver block section 16, box 200*d* represents the noise data collection for the twist ditches section 18, box 200*e* represents the noise data collection for the rope track section 20, and on to box 200*n* representing any additional track test sections or other static operational noise tests, such as door, trunk and hood opening and closing or other desired operations that are determined to be useful in noise testing.

After collecting the noise data at 200*a*-200*n*, the noise data from each test track section is segmented and processed (immediately after each test track section) to calculate the actual data curve for each test track section. At 300*a*-300*n*, the noise data collected from 200*a*-200*n* is processed and analyzed to obtain all points of the noise data collected from each microphone 90, 91 for the particular sound metric for the particular track section or static noise test and compare the data to the objective acceptable predetermined threshold limit values curves for the vehicle model that is similar to the selected vehicle 22. At 400*a*-400*n* the decision is made whether each of the individual curves passed or failed. For example, for microphone 1 on the bump track section for sharpness if every point of data was within the predetermined threshold limit value curve for that vehicle model then that one criterion is passed. At 300*a*, there may be numerous other comparisons, for example of the actual data curves for the bump track section for microphones 1 and 2, for six sound metrics (⅓ octave, power spectra, loudness, fluctuation, sharpness, and roughness). If all of the actual noise data from the actual curves falls within the predetermined threshold limit value curves, then at 400*a* the result is a yes or a pass. By way of further example, box 200*b* collects the noise data for the rumble strip section, which is analyzed and processed at 300*c* to create the actual data curves for the selected vehicle for each of the microphones 90, 91 and for each of the six sound metrics (⅓ octave, power spectra, loudness, fluctuation, sharpness, and roughness) for twelve data curves. At 400*b*, then the comparison is made of the twelve rumble strip data curves to the objective predetermined threshold limit value curves for the particular microphones and particular sound metrics for the vehicle model. Only if all of the data on the rumble strip actual noise data curves at 300*a* fall within the predetermined threshold limit value curves is the result at 400*b* a yes or pass result. This continues for all test track sections, 200*c*-200*n*, 300*c*-300*n* and 400*c*-400*n*. It will be appreciated that if any one of the results at 400*a*-400*n* is a fail or negative result, then a FAIL message is displayed at box 500. If all of the noise data collected at 200*a*-200*n* is within the permitted limit threshold value curves for every one of the sound metrics analyzed at 300*a*-300*n* for every one of the track test sections and static noise tests for each microphone, then at 400*a*-400*n* all results will be a yes or passing. Only if every single box at 400*a*-400*n* generates a yes for passing, will the tablet 92 then display a single PASS message result. In this way, the noise testing device 50 provides an automated and objective result for the test operator without any subjective judgment by the test operator.

At box 500, this resulting PASS or FAIL message is displayed on the noise testing device 50 and all of the raw test data and processed data and test results will be transmitted and stored in the quality report of the production control system 98. If a PASS message was indicated, then the selected vehicle 22 has passed and may proceed to box 600 which is the end of the noise testing at the production facility 100 at which time the noise testing device 50 is removed from selected vehicle 22. However, if any of the noise data collected at 200*a*-200*n* exceeds the permitted threshold limit value curves for even one data point on one of the test sections for even one of the microphones 90, 91 for even one of the sound metrics for the actual data curves generated or processed at 300*a*-300*n* by comparing the noise data measured for the individual selected vehicle 22 to the predetermined threshold limit value curves at 400*a*-400*n*, then at box 500, the tablet 92 will display a FAIL message result and put a HOLD into the production control system 98.

In the exemplary embodiment, for both a PASS and a FAIL result, at box 500 the collected noise data and analysis is sent to a quality control report in the production control system 98 and stored therein for future use and reference. If the tablet 92 displayed a FAIL message with a HOLD, then the method proceeds to box 700 where the selected vehicle 22 is analyzed and repaired. Once the selected vehicle 22 is believed to be repaired, then the vehicle 22 is put in queue to be re-tested in the same process and manner as starting back again at box 102 and looping through the process until the vehicle 22 receives a PASS result for the noise test and ends the noise testing process at box 600.

It will be appreciated that once the selected vehicle 22 has been tested to either a PASS or a FAIL decision for the noise test, then the portable and self-contained noise testing device 50 can advantageously be quickly removed from the selected vehicle 22 and the process can begin again for the next selected vehicle 22 in the production line. It will be appreciated that the noise testing device 50 can easily be removed as a single unit by simply releasing or unscrewing the locking knob 79 and rotating the hinged portion 67 to an open position whereby the recesses 73, 75 of the first and second mounting ends 74, 76 of the mounting device 60 can be slipped away from the first and second rods 28, 29 of the headrest structure 26 thus enabling removal of the entire noise testing 50 which can then be installed in the next selected vehicle 22. It will further be appreciated that in case the vehicle production facility 100 runs groups of different vehicles that the anchorage device 72 can be customized for the particular vehicle headrest structure 26 and is removably attached to the mounting device 60 for use in case of significantly different headrest structures 26 to enable a good locking fit to eliminate any movement of the noise testing device 50 relative to the headrest structure 26 during noise testing. It will further be appreciated that the vehicle production facility 100 may keep a sufficient number of noise testing devices 50 such that the noise testing device 50 may be kept locked to a failed vehicle until it is re-tested to pass the noise test.

It will further be appreciated that whether the selected vehicle 22 passes or fails the noise test, that some or all of the noise raw data and processed noise data and comparison results for the selected vehicle 22 are transferred to the quality report in the production control system 98 to be stored for additional uses. Such uses can be to immediately analyze a failed noise test at the vehicle production facility 100 for repairs, to identify trends in failed and passed vehicles to help for repair analyses, to save as a comparison reference for future customer warranty claims and noise degradation. Furthermore, the collected actual noise data from the selected vehicles 22 test may be used to further define the objective predetermined threshold limit value curves based on more sample data, as described herein.

Thus, it will be appreciated that the noise test is automatically conducted for each selected vehicle 22 in the production sequence using the noise testing device 50 in an entirely objective manner using actual data compared against objective predetermined threshold limit value curves without any subjective decisions or input by the test operator to enable consistent and accurate noise testing inspections at the facility without human subjectivity. It will further be appreciated that this self-contained and portable noise testing device 50 enables this objective and automated analysis while not increasing the total test time of the noise test and providing instant, objective feedback to the test operator and production control system 98 to ensure that the selected vehicle 22 with any perceptible noise defect does not get delivered to the customer. It will also be appreciated that the production facility 100 may keep at least two or more noise testing devices 50 available such that the installation of one beginning the noise test and the removal of another ending the noise test can be at the same which is easily achievable and affordable with this portable noise testing device 50. Since the noise test can be conducted so quickly and efficiently using this objective analysis methodology and portable noise testing device 50, it will be appreciated that every vehicle 22 on the line at the production facility 100 can advantageously be tested rather than selecting only a random sampling.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of objectively noise testing a plurality of vehicles at a vehicle production facility having a production control system comprising:
    selecting one of the plurality of vehicles at the vehicle production facility for noise testing;
    mounting a noise testing device to an interior of the selected vehicle;
    testing the selected vehicle by operating the selected vehicle on a noise-inducing test track having a plurality of test track sections and recording noise data on the noise testing device; and
    segmenting the recorded noise data for each of the plurality of test track sections and processing the recorded noise data to determine a plurality of sound metrics for each of the test track sections for the selected vehicle to generate a plurality of actual test data curves associated with each of the plurality of sound metrics for each of the plurality of test track sections.

2. The method of claim 1, further comprising:
    comparing each of the plurality of actual test data curves for the selected vehicle to a plurality of objectively predetermined threshold limit value curves for each of the plurality of sound metrics for each of the plurality of test track sections to determine whether every point on the plurality of actual test data curves are within threshold limit values of the predetermined threshold limit value curves; and displaying a passing result on the noise testing device if every point on the actual test data curves are within the threshold limit values of the predetermined threshold limit value curves, and displaying a failing result on the noise testing device if even a single point of the plurality of actual test data curves is outside of the threshold limit values of the predetermined threshold limit value curves for even one of the plurality of sound metrics for even one of the plurality of test track sections whereby the noise testing device automatically provides a test operator with a single objective noise testing result for the selected vehicle without any subjective analysis by a human test operator.

3. The method of claim 2, wherein the noise testing device includes at least two microphones, the method further comprising:
    further segmenting the recorded noise data into actual test data curves for each microphone and comparing the actual data curves to predetermined threshold limit value curves for each of the microphones for each of the plurality of sound metrics for each of the plurality of test track sections.

4. The method of claim 2, wherein the plurality of vehicles includes a plurality of vehicle models and wherein the plurality of sound metrics is customized to include only critical sound metrics for the vehicle model based on a set of predetermined critical threshold limit value curves.

5. The method of claim 2, wherein the production control system and the noise testing device are in communication with each other, the method further comprising:
    providing a vehicle identification number to one of the production control system or the noise testing device;
    synchronizing the production control system and noise testing device to share data associated with the vehicle identification number including a vehicle model for the selected vehicle;
    providing the noise testing device with one or more predetermined threshold limit value curves for the selected vehicle based on its vehicle model;
    limiting the noise data processing to determining a set of critical actual data curves only for certain sound metrics from certain test track sections associated with the set of predetermined critical threshold limit value curves; and
    comparing and generating the passing or failing result only utilizing the critical actual data curves compared with the set of predetermined critical threshold limit value curves.

6. The method of claim 2, wherein when a failing result is generated, the selected vehicle is put on hold at the vehicle production facility and taken out of a production line for analysis and repair.

7. The method of claim 2, further comprising:
    determining the predetermined threshold limit value curves by testing a plurality of vehicle samples on the test track with the noise testing device, having a test operator subjectively judge whether the samples are good or bad, segregating the noise data for each of the good samples for each of the test track sections, processing the noise data to determine the plurality of actual data curves for the plurality of sound metrics for each of the good samples for each of the test track sections, averaging the plurality of actual data curves for the objectively good samples for each of the plurality of sound metrics for each of the test track sections to obtain an average data curve for each of the plurality sound metrics for each of the plurality of test track sections, and applying a statistical adjustment factor to each of the actual average data curves of the good samples to establish a set of predetermined threshold limit value curves for each of the plurality of sound metrics for each of the test track sections.

8. The method of claim 2, further comprising: determining the plurality of acceptable predetermined threshold limit value curves by testing a plurality of vehicles wherein the plurality of vehicles may include a plurality of vehicle models, wherein the noise test results are segregated by vehicle model and wherein the predetermined threshold limit value curves are determined separately for each of the plurality of vehicle models.

9. The method of claim 1, wherein the plurality of sound metrics includes at least two or more sound metrics selected from the group consisting of loudness, one third octave analysis, power spectra, fluctuation, sharpness, and roughness.

10. The method of claim 1, wherein the plurality of test track sections includes at least two or more selected from the group consisting of a bump track section, a rumble strip section, a paver block section, a rope track section, and a twisted ditches section.

11. The method of claim 1, wherein the production control system has non-transitory storage capacity and wherein the noise testing device is in communication with the production control system, the method further comprising:
sending and storing the recorded noise data to the production control system.

12. The method of claim 1, wherein the step of mounting the noise testing device to the interior of the selected vehicle further includes securely locking a mounting portion of the noise testing device onto a vehicle headrest prior to testing the selected vehicle.

13. The method of claim 1, wherein the step of mounting the noise testing device to the interior of the selected vehicle further includes securely locking a mounting portion of the noise testing device onto first and second rods of a vehicle headrest prior to testing and removing the noise testing device from the vehicle headrest by unlocking the mounting portion of the noise testing device from the first and second rods of the vehicle headrest when the noise testing is complete whereby the noise testing device is portable between selected vehicles.

14. A method of objectively noise testing a plurality of vehicles at a vehicle production facility having a production control system, the method comprising:
selecting one of the plurality of vehicles at the vehicle production facility for noise testing;
providing a noise testing device that is in communication with the production control system;
inputting a motor vehicle identification number of the selected vehicle into the noise testing device and storing the motor vehicle identification number in the production control system;
mounting the noise testing device to an interior of the vehicle;
testing the selected vehicle by operating the vehicle on a test track having a plurality of test track sections and recording the noise data on the noise testing device;
determining a plurality of actual test curves for each of a plurality of sound metrics for each of the plurality of test track sections for the selected vehicle;
comparing each of the plurality of actual test curves for the selected vehicle to a plurality of predetermined threshold limit value curves for each of the plurality of sound metrics for each of the plurality of test track sections for a similar vehicle model having good noise performance to determine if any point on the plurality of actual test curves for the selected vehicle is outside of the predetermined threshold limit value curves; and
generating and displaying a pass message on the noise testing device when all of the plurality of points on the plurality of actual test curves is determined to be within the predetermined threshold limit value curves whereby the selected vehicle can proceed in the vehicle production facility, and generating and displaying a fail message on the noise testing device when any of the plurality of points on the plurality of actual test curves is determined to be outside of the predetermined threshold limit value curves whereby the selected vehicle is directed to be held from proceeding in the vehicle production facility and is analyzed and repaired;
whereby the selected vehicle is objectively and automatically analyzed for passing or failing the noise test without any subjective input from a test operator.

15. The method of claim 14, wherein the plurality of sound metrics includes two or more of one-third octave analysis, power spectra, loudness, fluctuation, sharpness, and roughness.

16. The method of claim 14, wherein the step of mounting the noise testing device
to the interior of the vehicle further includes mounting the noise testing device to a headrest structure of a vehicle seat utilizing a locking portion on the mounting device and wherein the method further includes removing the noise testing device from the headrest structure by unlocking the locking portion of the mounting device from the headrest structure.

17. A noise testing system for testing a selected vehicle in a vehicle production facility having a production control system, comprising:
a noise testing device having a mounting device for removably connecting the noise testing device to a headrest structure of a seat of the selected vehicle, the mounting device including at least one microphone for recording noise data and a sound module;
the mounting device including an anchorage device configured to removably lock and unlock from the vehicle headrest; and
the noise testing device being configured to communicate with the production control system,
wherein the headrest structure includes a first rod and a second rod, and the anchorage device includes a first end and a second end, the first end having a concave recess for receiving the first rod therein and the second end having a rotatable hinged portion for releasably receiving the second rod therein, and the second end includes a locking portion having a locking knob configured to lock the hinged portion around the second rod;

whereby when the hinged portion is rotated to a closed position and the locking knob is locked, the first and second ends are securely locked onto the first and second rods such that the noise testing device is securely mounted on the headrest during noise testing and thereafter removable for porting to another vehicle on a production line at the vehicle production facility.

18. The noise testing system of claim 17, wherein the noise testing device and the production control system are in communication with each other such that a vehicle identification number is synchronized between the noise testing device and the production control system for each selected vehicle whereby the noise data recorded from the vehicle can be stored in the production control system in association with the vehicle identification number.

* * * * *